United States Patent
Oehler et al.

(10) Patent No.: US 10,591,078 B2
(45) Date of Patent: Mar. 17, 2020

(54) FLUID FLOW CONTROL DEVICE

(71) Applicant: The Boeing Company, Chicago, IL (US)

(72) Inventors: Stephen D. Oehler, Maple Valley, WA (US); Frederick T. Calkins, Renton, WA (US); Jeffrey L. Duce, Maple Valley, WA (US)

(73) Assignee: The Boeing Company, Chicago, IL (US)

( * ) Notice: Subject to any disclaimer, the term of this patent is extended or adjusted under 35 U.S.C. 154(b) by 371 days.

(21) Appl. No.: 15/380,923

(22) Filed: Dec. 15, 2016

(65) Prior Publication Data

US 2018/0172172 A1    Jun. 21, 2018

(51) Int. Cl.
*F16K 31/02* (2006.01)
*F16K 49/00* (2006.01)
*F16K 7/18* (2006.01)

(52) U.S. Cl.
CPC .......... *F16K 31/025* (2013.01); *F16K 49/002* (2013.01); *F16K 7/18* (2013.01)

(58) Field of Classification Search
CPC . B64G 1/26; F16K 31/025; F16K 7/18; F16K 1/2007; F16K 49/002; F16K 31/002; F16K 99/0044; F16K 99/0038; F16K 99/0051
USPC .................................................... 251/212, 11
See application file for complete search history.

(56) References Cited

U.S. PATENT DOCUMENTS

| | | | |
|---|---|---|---|
| 3,489,203 A | 1/1970 | Fischell | |
| 4,284,443 A | 8/1981 | Hilton | |
| 4,319,763 A | 3/1982 | White | |
| 5,408,069 A | 4/1995 | Mischel | |
| 5,565,124 A | 10/1996 | Balzano | |
| 5,753,893 A | 5/1998 | Noda et al. | |
| 7,690,621 B2 * | 4/2010 | Grummon | C23C 14/205 204/192.14 |
| 8,575,523 B2 | 11/2013 | Chivers et al. | |
| 9,161,393 B2 | 10/2015 | Kaiserman et al. | |
| 9,736,888 B2 | 8/2017 | Duce et al. | |
| 2002/0027133 A1 | 3/2002 | Kellogg et al. | |
| 2002/0043525 A1 | 4/2002 | Laken et al. | |
| 2003/0149505 A1 | 8/2003 | Mogensen | |

(Continued)

FOREIGN PATENT DOCUMENTS

| | | |
|---|---|---|
| DE | 102008058529 A1 | 5/2010 |
| EP | 1366990 | 12/2003 |

(Continued)

OTHER PUBLICATIONS

Extended European Search Report for European Patent Application No. 17162125.3 dated Sep. 25, 2017.

(Continued)

*Primary Examiner* — Craig J Price
*Assistant Examiner* — Andrew J Rost
(74) *Attorney, Agent, or Firm* — Kunzler Bean & Adamson

(57) ABSTRACT

Disclosed herein is a flow control device. The flow control device comprises a sheet made from a shape memory alloy. The flow control device also comprises at least one slit through the sheet. At least the one slit defines at least one flap in the sheet. The flow control device further comprises at least one electrically-resistive trace printed on the sheet at least one of on or adjacent at least the one flap. Upon receipt of an electrical current, at least the one electrically-resistive trace configured to generate heat for deforming at least the one flap relative to the sheet and opening an aperture formed in the sheet.

24 Claims, 15 Drawing Sheets

(56) References Cited

U.S. PATENT DOCUMENTS

| | | |
|---|---|---|
| 2004/0100131 A1 | 5/2004 | Howick et al. |
| 2004/0155020 A1 | 8/2004 | Worrell et al. |
| 2006/0191887 A1 | 8/2006 | Baer et al. |
| 2009/0266810 A1 | 10/2009 | Chivers et al. |
| 2010/0065542 A1 | 3/2010 | Dubey |
| 2010/0294476 A1* | 11/2010 | Gomi .................. F16K 31/002 165/276 |
| 2011/0226751 A1 | 9/2011 | Lazanja et al. |
| 2016/0270152 A1 | 9/2016 | Duce et al. |
| 2016/0270153 A1 | 9/2016 | Duce et al. |
| 2017/0290096 A1 | 10/2017 | Duce et al. |
| 2018/0171990 A1 | 6/2018 | Oehler et al. |

FOREIGN PATENT DOCUMENTS

| | | |
|---|---|---|
| FR | 2905933 | 3/2008 |
| WO | 2010111364 | 9/2010 |

OTHER PUBLICATIONS

Paik, "A bidirectional shape memory alloy folding actuator," Smart Materials and Structures, 2012, pp. 1-8, vol. 21, IOP Publishing.

"Thick-Film Heaters Made From Dielectric-Coated Stainless-Steel Substrates," ESL ElectroScience, 2016, pp. 1-4, http://electroscience.com/thick-film-heaters-made-dielectric-coated-stainless-steel-substrates accessed Dec. 15, 2016.

"Printed Flexible Heaters ad Warming Elements," GSI Technologies, LLC, 2016, pp. 1-3, http://www.gsitech.com/heater-and-warming-element-printing-ptc/ accessed Dec. 15, 2016.

"Material Solutions for Self-Limiting Heaters," Dupont, 2016, pp. 1-2, http://www.dupont.com/products-and-services/electronic-electrical-materials/printed-electronics/products/self-limiting-heaters.html accessed Dec. 15, 2016.

Extended European Search Report for European Patent Application No. 16159893.3 dated Jul. 20, 2016.

* cited by examiner

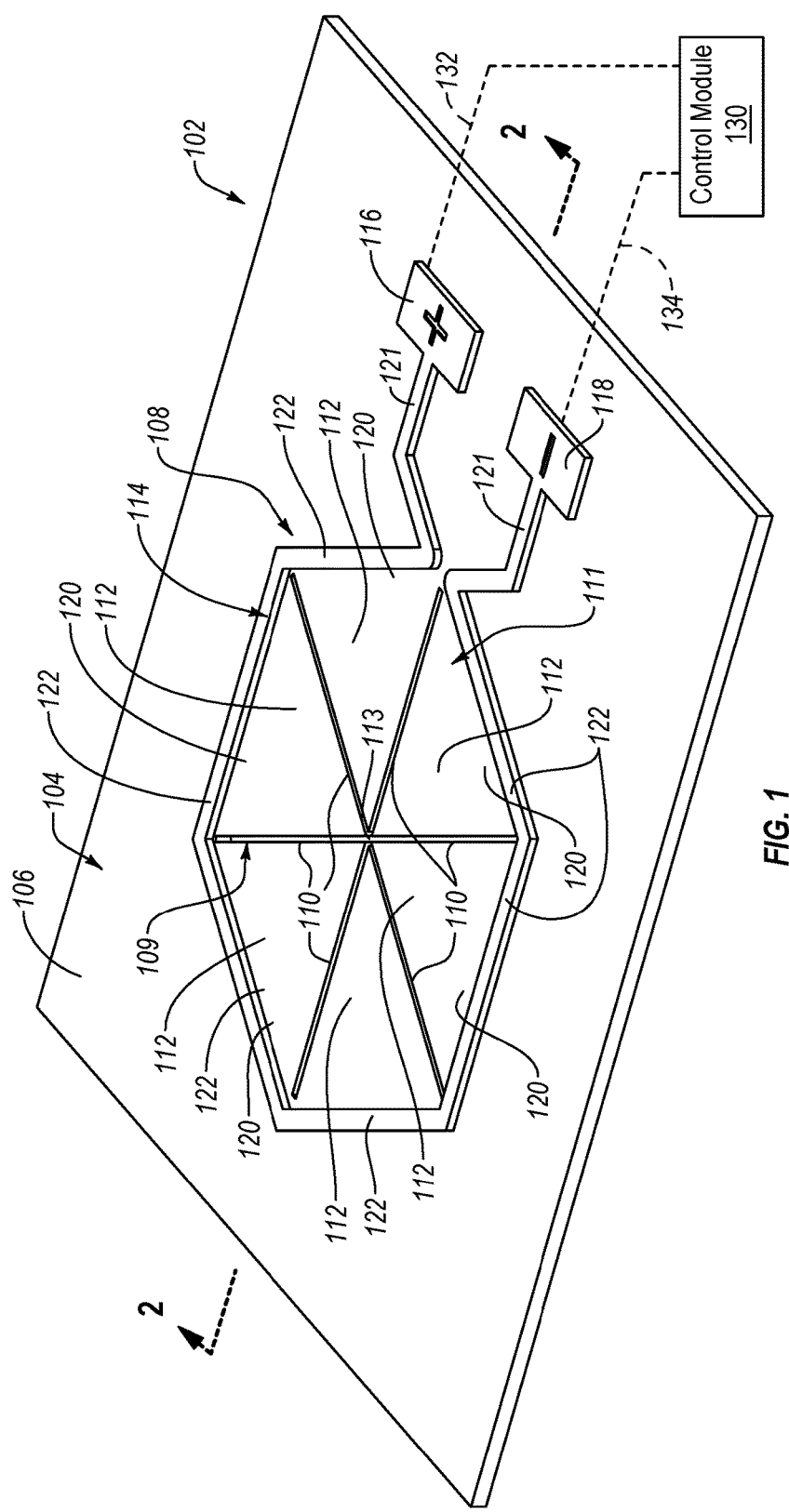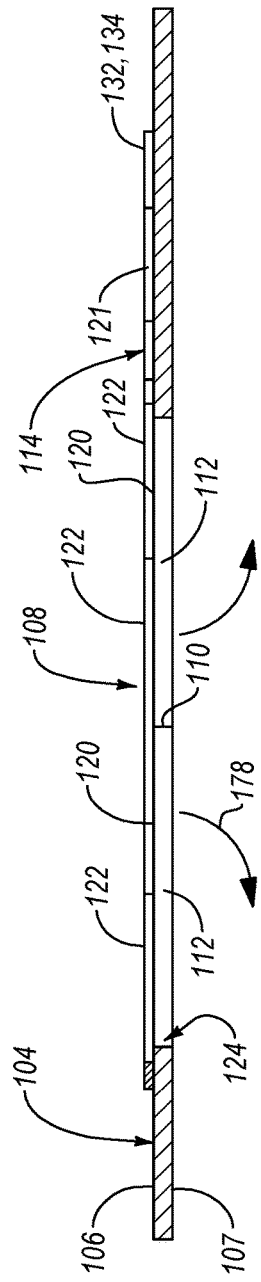

FLUID FLOW CONTROL DEVICE

FIELD

This disclosure relates generally to fluid flow regulation, and more particularly to a fluid flow control device made from a shape memory alloy.

BACKGROUND

Some high-tech industries have started incorporating shape-memory alloys into various products. Today, many complex structures, such as aircraft, spacecraft, automobiles, and the like, include shape-memory alloys. Shape-memory alloys are special metallic materials that are capable of returning to a previously defined shape (e.g., an initial state) after being heated to deformation (e.g., a deformed state).

The unique characteristics (e.g., pseudoelasticity and shape memory effect) of shape-memory alloys promote their use in different applications. However, due to relatively slow transformations from the deformed shape back to the original shape, shape-memory alloys remain impractical for many applications, particularly where rapid response times are useful.

SUMMARY

The subject matter of the present application has been developed in response to the present state of the art, and in particular, in response to the shortcomings of flow control devices that have not yet been fully solved by currently available techniques. Accordingly, the subject matter of the present application has been developed to provide a flow control device, and associated apparatus and method, that overcome at least some of the shortcomings of prior art techniques.

Disclosed herein is a flow control device. The flow control device comprises a sheet made from a shape memory alloy. The flow control device also comprises at least one slit through the sheet. At least the one slit defines at least one flap in the sheet. The flow control device further comprises at least one electrically-resistive trace printed on the sheet at least one of on or adjacent at least the one flap. Upon receipt of an electrical current, at least the one electrically-resistive trace configured to generate heat for deforming at least the one flap relative to the sheet and opening an aperture formed in the sheet. The preceding subject matter of this paragraph characterizes example 1 of the present disclosure.

At least the one electrically-resistive trace is made from a positive temperature coefficient ink. The preceding subject matter of this paragraph characterizes example 2 of the present disclosure, wherein example 2 also includes the subject matter according to example 1, above.

At least the one electrically-resistive trace is printed adjacent at least the one flap. The preceding subject matter of this paragraph characterizes example 3 of the present disclosure, wherein example 3 also includes the subject matter according to any one of examples 1-2, above.

At least the one electrically-resistive trace is printed on at least the one flap. The preceding subject matter of this paragraph characterizes example 4 of the present disclosure, wherein example 4 also includes the subject matter according to any one of examples 1-3, above.

The flow control device further comprises a control module electrically coupleable with at least the one electrically-resistive trace and configured to control the electrical current delivered to at least the one electrically-resistive trace. The preceding subject matter of this paragraph characterizes example 5 of the present disclosure, wherein example 5 also includes the subject matter according to any one of examples 1-4, above.

The control module comprises a sensor module configured to receive sensed feedback from a sensor of a system. The control module is further configured to control the electrical current delivered to at least the one electrically-resistive trace responsive to the sensed feedback. The preceding subject matter of this paragraph characterizes example 6 of the present disclosure, wherein example 6 also includes the subject matter according to example 5, above.

The control module is further configured to adjust a magnitude of the electrical current delivered to at least the one electrically-resistive trace, a magnitude of the heat generated by at least the one electrically-resistive trace in response to an adjustment to the magnitude of the electrical current, and a deformation of at least the one flap relative to the sheet and an openness of the aperture formed in the sheet in response to the adjustment to the magnitude of the electrical current. The preceding subject matter of this paragraph characterizes example 7 of the present disclosure, wherein example 7 also includes the subject matter according to any one of examples 5-6, above.

The flow control device further comprises a set of slits through the sheet and intersecting each other. The set of slits intersect each other to define a set of flaps in the sheet. At least the one electrically-resistive trace is printed on the sheet on or adjacent each of the flaps of the set of flaps. Upon receipt of the electrical current, at least the one electrically-resistive trace is further configured to generate heat for deforming each of the flaps of the set of flaps relative to the sheet and opening the aperture formed in the sheet. The preceding subject matter of this paragraph characterizes example 8 of the present disclosure, wherein example 8 also includes the subject matter according to any one of examples 1-7, above.

The flow control device according to claim further comprises a plurality of sets of slits through the sheet, wherein each set of the plurality of sets of slits defines a respective set of a plurality of sets of flaps. The flow control device also comprises a plurality of electrically-resistive traces printed on the sheet. Each electrically-resistive trace of the plurality of electrically-resistive traces is at least one of on or adjacent each of the flaps of a respective set of the plurality of sets of flaps. Each electrically-resistive trace of the plurality of electrically-resistive traces additionally is configured to generate heat for deforming the flaps of a respective set of the plurality of sets of flaps and opening a respective aperture of a plurality of apertures formed in the sheet. The preceding subject matter of this paragraph characterizes example 9 of the present disclosure, wherein example 9 also includes the subject matter according to example 8, above.

The flow control device further comprises a control module electrically coupleable with the plurality of electrically-resistive traces and configured to separately and independently control the electrical current delivered to the plurality of electrically-resistive traces to separately and independently open the plurality of apertures formed in the sheet. The preceding subject matter of this paragraph characterizes example 10 of the present disclosure, wherein example 10 also includes the subject matter according to example 9, above.

The sheet is a two-dimensional sheet. The preceding subject matter of this paragraph characterizes example 11 of the present disclosure, wherein example 11 also includes the subject matter according to any one of examples 1-10, above.

At least the one flap in the sheet comprises a hinge line. At least the one electrically-resistive trace is printed on the sheet on the hinge line of at least the one flap. The preceding subject matter of this paragraph characterizes example 12 of the present disclosure, wherein example 12 also includes the subject matter according to any one of examples 1-11, above.

Additionally disclosed herein is an apparatus that comprises a structure through which a material is flowable. The apparatus also comprises a flow control device coupled to the structure to control flow of the material through the structure. The flow control device comprises a sheet made from a shape memory alloy. The flow control device also comprises at least one flow control element that comprises at least one slit through the sheet. At least the one slit defines at least one flap in the sheet. The flow control device additionally comprises at least one electrically-resistive trace printed on the sheet at least one of on or adjacent at least the one flap. Upon receipt of an electrical current, at least the one electrically-resistive trace is configured to generate heat for deforming at least the one flap relative to the sheet and opening an aperture formed in the sheet. The preceding subject matter of this paragraph characterizes example 13 of the present disclosure.

The structure comprises a container comprising at least one wall that defines an interior cavity. The at least one wall comprises the flow control device. The flow control device is configured to control flow of the material between the interior cavity and a space adjacent and external to the interior cavity. The preceding subject matter of this paragraph characterizes example 14 of the present disclosure, wherein example 14 also includes the subject matter according to example 13, above.

The structure comprises a core layer comprising at least one cell. The flow control device is coupled to the core layer and configured to control flow through at least the one cell. The preceding subject matter of this paragraph characterizes example 15 of the present disclosure, wherein example 15 also includes the subject matter according to any one of examples 13-14, above.

The core layer further comprises multiple cells. The flow control device further comprises multiple flow control elements each configured to control flow through a respective cell of the multiple cells. The preceding subject matter of this paragraph characterizes example 16 of the present disclosure, wherein example 16 also includes the subject matter according to example 15, above.

The structure comprises a wall comprising a first layer and a second layer. The flow control device is embedded between the first layer and the second layer of the wall. The preceding subject matter of this paragraph characterizes example 17 of the present disclosure, wherein example 17 also includes the subject matter according to any one of examples 13-16, above.

The structure comprises a conduit. The flow control device is positioned within the conduit. The preceding subject matter of this paragraph characterizes example 18 of the present disclosure, wherein example 18 also includes the subject matter according to example 13, above.

Also disclosed herein is a method of making a flow control device. The method comprises forming at least one slit through a sheet made from a shape memory alloy to define a flap in the sheet. The method also comprises printing at least one electrically-resistive trace on the sheet on or adjacent the flap. The method additionally comprises training the flap to deform in a predetermined manner when heated. The preceding subject matter of this paragraph characterizes example 19 of the present disclosure.

Further disclosed herein is a method of controlling flow comprising passing an electrical current through at least one electrically-resistive trace printed on a sheet made from a shape memory alloy at a first location on or adjacent a flap of the sheet defined by at one slit through the sheet. The method also comprises transferring heat generated by at least the one electrically-resistive trace to the sheet at the first location. The method further comprises deforming the flap via heat transferred from at least the one electrically-resistive trace to open an aperture in the sheet. The preceding subject matter of this paragraph characterizes example 20 of the present disclosure.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter, they are not therefore to be considered to be limiting of its scope. The subject matter will be described and explained with additional specificity and detail through the use of the drawings, in which:

FIG. 1 is a schematic perspective view of a flow control device, in a closed state, according to one or more embodiments of the present disclosure;

FIG. 2 is a schematic cross-sectional side elevation view of the flow control device of FIG. 1, taken along the line 2-2 of FIG. 1, according to one or more embodiments of the present disclosure;

DETAILED DESCRIPTION

Figures 3, 4:
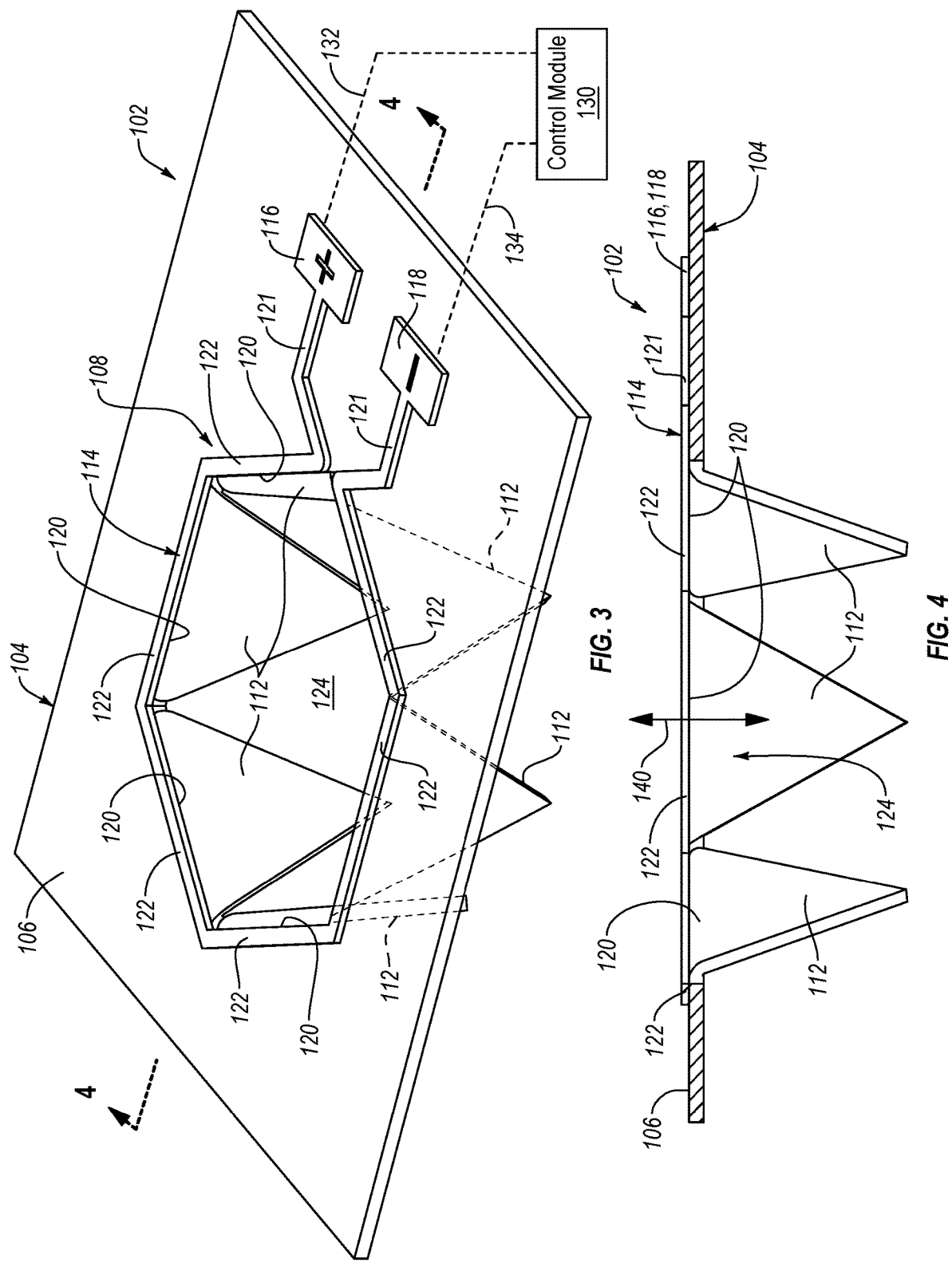
FIG. 3 is a schematic perspective view of the flow control device of FIG. 1, in an open state, according to one or more embodiments of the present disclosure.
FIG. 4 is a schematic cross-sectional side elevation view of the flow control device of FIG. 3, taken along the line 4-4 of FIG. 3, according to one or more embodiments of the present disclosure.

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

The present disclosure provides a flow control device that uses shape memory material, such as a shape memory alloy. The shape memory material is bendable, such as about a hinge line, and is controlled by electrical traces printed on the shape memory material, such as at or near the hinge lines. Accordingly, the herein-described flow control device provides at least some of the benefits of shape memory materials, while having relatively rapid accurate movement of the shape memory material, to provide efficient, reliable, and inexpensive control of fluid through a structure.

Referring to FIGS. 1-4, according to one embodiment, a flow control device 102 includes a sheet 104 and a flow control element 108. The flow control element 108 includes slits 110 through the sheet 104 and an electrically-resistive trace 114 printed, or otherwise deposited, on the sheet 104. The slits 110 define flaps 112 in the sheet 104. The electrically-resistive trace 114 is printed (e.g., directly written) on the sheet 104 adjacent the flaps 112. Upon receipt of an electrical current from a power source 184 (see, e.g., FIG. 16), the electrically-resistive trace 114 generates heat, which deforms the flaps 112 relative to the sheet 104 and opens an aperture 124 formed in the sheet 104.

The sheet 104 is made from a shape memory alloy. Generally, a shape-memory alloy is in a martensite low temperature phase with a cubic or monoclinic crystal structure, which begins to transform into an austenite high temperature phase with a cubic crystal upon reaching a first austenite threshold temperature. The transformation from the martensite low temperature phase to the austenite high temperature phase is completed upon reaching a second austenite threshold temperature higher than the first austenite threshold temperature. From the austenite high temperature phase, the transformation to the martensite low temperature phase is initiated and completed after the temperature of the shape-memory alloy is cooled below first and second martensite threshold temperatures, respectively. As the shape-memory alloy transforms between the austenite high temperature phase and martensite low temperature phase, the alloy physically deforms between an original shape and a deformed shape.

The shape memory alloy can be configured to deform between an original shape and a deformed shape based on the temperature of the shape memory alloy. More specifically, shape memory alloys are special metallic materials that are capable of returning to a previously defined shape (e.g., original shape) after being heated to deformation (e.g., a deformed state). Generally, a shape memory alloy can be trained to deform in a particular manner from the original shape into the deformed state when a temperature of the shape memory alloy increases beyond an upper temperature threshold and deform in the same manner back to the original shape from the deformed state when the temperature of the shape memory alloy decreases below a lower temperature threshold. In some embodiments, the shape memory alloy of the sheet 104 is at least one of various nickel-titanium alloys and copper-based alloys, among others. The composition of the shape memory alloy can be selected to provide a desired range of deformation as well as desired upper and lower threshold temperatures associated with respective phase changes of the alloy.

In the illustrated embodiment, when in the original shape, the sheet 104, including the flaps 112, has a planar or two-dimensional shape and a thin-walled construction. In other words, a first surface 106 of the sheet 104 and a second surface 107 of the sheet, opposite the first surface 106, are flat and parallel to each other. Additionally, a thickness of the sheet 104 between the first surface 106 and the second surface 107 is substantially less than a width and/or length of the sheet 104. Due to the planarity of the sheet 104, the sheet 104 can be integrated into a variety of structures with minimal intrusion, as will be described in more detail below. Although illustrated as rectangular, the outer periphery of the sheet 104 can be any of various shapes. Moreover, the sheet 104 can be any of various sizes relative to the slits 110 and the electrically-resistive trace 114. In some implementations, the original shape of the sheet 104 is non-planar, such as curved.

The slits 110 of the flow control element 108 pass entirely through the sheet 104 such that the slits 110 can be defined as through-slits. In other words, the slits 110 define gaps in the sheet 104 through an entire thickness of the sheet 104. The slits 110 are very thin relative to their lengths. In some implementations, the slits 110 are razor thin. The slits 110 are organized as a set of slits 109 and arranged into a particular pattern corresponding with a set of flaps 111 having flaps 112 of a desired shape and size. In the illustrated embodiment, the slits 110 of the set of slits 109 are elongate, linear, and have the same length. Moreover, the slits 110 of the set of slits 109 are uniformly circumferentially distanced from each other intersect with each other at a central point 113 that defines a center of the aperture 124 formed in the sheet 104. More specifically, the central point 113 is located at a midpoint of each of the slits 110 of the set of slits 109. Accordingly, the slits 110 are arranged into a symmetrical starburst or asterisk shaped pattern.

Corresponding with the pattern of the set of slits 109, the flaps 112 of the flow control element 108 of the set of flaps 111 have the same triangular shape and size. The flaps 112 are uniformly positioned about the central point 113 with the apex of each flap 112 located at the central point 113. Generally, each flap 112 has two free edges, defined by adjacent slits 109, and one fixed edge. The fixed edge of each flap 112 defines a hinge line 120 of the flap 112. The fixed edge of each flap 112 forms a one-piece monolithic homogenous and contiguous intersection between the flap 112 and the rest of the sheet 104. In other words, each flap 112 is not separately formed and attached to the sheet 104, but rather is formed together with the sheet 104 so as to form part of the sheet 104. As will be described in more detail below, the hinge line 120 of each flap 112 is configured, via a learning process, to deform when heated to allow the flap 112 to rotate about the hinge line 120.

The electrically-resistive trace 114 of the flow control element 108 is printed on the first surface 106 of the sheet 104 adjacent the flaps 112. Generally, the electrically-resistive trace 114 is a thin bead or layer of electrically-resistive material (e.g., hardened ink) that is deposited directly onto the first surface 106 of the sheet 104. The electrically-resistive trace 114 is positioned about, but in close proximity to, the set of flaps 111 in certain implementations. More specifically, the electrically-resistive trace 114 is effectively divided into contiguous sections 122 each adjacent the hinge line 120 of a respective one of the flaps 112. According to one implementation, each section 122 of the electrically-resistive trace 114 is just distanced from and parallel to the hinge line 120 of the respective flap 112. Accordingly, the electrically-resistive trace 114 forms a polygonal shape (e.g., hexagonal) with a number of sides (e.g., sections 122) equal to the number of flaps 112. In some implementations, each section 122 of the electrically-resistive trace 114 is printed on the hinge line 120 of a respective flap 112.

The electrically-resistive material of the electrically-resistive trace 114 is made from any of various electrically conductive materials configured to generate heat (i.e., increase in temperature) when an electrical current is passed through the electrically-resistive material. In other words, the electrically-resistive trace 114 acts as a resistance heater to heat targeted portions of the sheet 104. According to one implementation, the electrically-resistive material has a minimum electrical resistance between about 0.5 ohm and about 1,000 ohm. Generally, with some exceptions, the heat generated by, or the temperature of, the electrically-resistive trace 114 is proportional to the magnitude of the electrical current passed through the electrically-resistive trace 114. Accordingly, in certain implementations, the heat generated by, or the temperature of, the electrically-resistive trace 114 is controlled by controlling the magnitude of the electrical current being passed through the electrically-resistive trace 114.

In some implementations, the electrical resistance of the electrically-resistive material is constant or independent of the temperature of the electrically-resistive material. Accordingly, the temperature of the electrically-resistive material will steadily increase with an increase in the magnitude of the electrical current without limit. For this reason, in these implementations, components and systems that control the supply of electrical current to the electrically-resistive trace 114 include safety features that limit the magnitude of the electrical current.

However, in other implementations, the electrical resistance of the electrically-resistive material varies or is dependent on the temperature of the electrically-resistive material. According to one implementation, the electrically-resistive material of the electrically-resistive trace 114 is a switching-type positive temperature coefficient (PTC) material. The PTC material includes additives that promote thermally self-regulating properties of the electrically-resistive trace 114. More specifically, the additives of the PTC material are made from materials that collectively make the electrically-resistive trace 114 have a switching-type positive temperature coefficient (PTC). In some implementations, the PTC material of the electrically-resistive trace 114 is made from poly-crystalline ceramic materials, such as barium carbonate and titanium oxide, that are highly electrically resistive in an original state, but are made semi-conductive by the addition of dopants, such as tantalum, silica, and manganese. Accordingly, the switching-type PTC material of the electrically-resistive trace 114 may include a combination of poly-crystalline ceramic materials and conductive dopants. In other implementations, the switching-type PTC material of the electrically-resistive trace 114 is made from an electrically non-conductive plastic material with embedded conductive grains, such as carbon grains.

Generally, the switching-type PTC material of the electrically-resistive trace 114 self-regulates or self-limits the temperature of the electrically-resistive trace 114 by increasing the electrical resistance of the switching-type PTC material as the temperature of the electrically-resistive trace 114 increases. As the temperature of the switching-type PTC material approaches an equilibrium temperature, which can be defined as a maximum, transition, or Curie temperature of the PTC material, the electrical resistance of the PTC material "switches" to rapidly increases toward infinite resistance. In some implementations, the equilibrium temperature is defined as the temperature at which the electrical resistance of the PTC material is about twice the resistance as a minimum electrical resistance of the PTC material. The rapid increase in the electrical resistance at the equilibrium temperature rapidly reduces the electrical current allowed to flow through the PTC material. With less current flowing through the PTC material, the temperature of the PTC material correspondingly drops below the equilibrium temperature, which results in a corresponding drop in the electrical resistance of the PTC material and an increase in the current allowed through the PTC material. The increase in current contributes to an increase in the temperature of the PTC material until the equilibrium temperature is again established and the cycle of rapidly increasing the electrical resistance, rapidly decreasing the current, and decreasing the temperature of the PTC material is continued.

In the above manner, with the supply of electrical power from the electrical power source 184 at a constant (e.g., unchanging) voltage above an equilibrium voltage, the unique properties of the PTC material allow the PTC material to self-limit its temperature to increase up to but not exceed an equilibrium temperature. Furthermore, because the PTC material self-regulates its temperature, extraneous components and systems, such as safety features, for limiting the electrical current to and the temperature of the electrically-resistive trace 114 are not necessary.

The flow control element 108 additionally includes electrical leads 121 and electrical pads 116, 118 printed, or otherwise deposited, on the first surface 106 of the sheet 104 in some implementations. The electrically-resistive trace 114, electrical leads 121, electrical pads 116, 118, and power source 184 form an electrical circuit. The electrical pad 116 is configured to be electrically coupled to the positive-side of an electrical power source and the electrical pad 118 is configured to be electrically coupled to the negative-side of the electrical power source. Electrical current from the electrical pad 116 flows to the electrically-resistive trace 114 via one of the electrical leads 121. Similarly, electrical current from the electrically-resistive trace 114 flows to the electrical pad 118 via the other of the electrical leads 121. The electrical leads 121 and the electrical pads 116, 118 are made from an electrically conductive material. In one implementation, the electrical leads 121 and/or the electrical pads 116, 118 are made from the same electrically-resistive material as the electrically-resistive trace 114. However, in other implementations, the electrical leads 121 and/or the electrical pads 116, 118 are made from an electrically conductive material that is different than the electrically-resistive material of the electrically-resistive trace 114. For example, in one implementation, the electrical leads 121 and/or the electrical pads 116, 118 are made from an electrically conductive material that has a lower electrical resistance than the electrically-resistive material of the electrically-resistive trace 114.

The flow control device 102 further includes a control module 130 that is configured to control the electrical current delivered to the electrically-resistive trace 114 and thus the heat generated by the electrically-resistive trace 114. The control module 130 is electrically coupled to the electrically-resistive trace 114 via a positive electrical connector 132 and a negative electrical connector 134. The positive electrical connector 132 is electrically coupled with the electrical pad 116 and the negative electrical connector 134 is electrically coupled with the electrical pad 118. The electrical connectors 132, 134 can be any of various connectors, such as wires, cables, plugs, terminals, and the like.

The electrically-resistive trace 114, together with the control module 130, control the temperature, and thus the deformation of, the flaps 112 between a closed state (see, e.g., FIGS. 1 and 2) and an open state (see, e.g., FIGS. 3 and 4). In the closed state, the flaps 112 are co-planar with the rest of the sheet 104 and occupy the space defined by the aperture 124 to effectively block or close the aperture 124. In one implementation, from the closed state, as the heat generated by the sections 122 of the electrically-resistive trace 114 raises the temperature of the respective flaps 112 at the hinge lines 120 beyond an upper temperature threshold of the shape memory alloy at the hinge lines 120, the hinge lines 120 deform and the flaps 112 rotate or torque about the respective hinge lines 120 in a first rotational direction 178 (see, e.g., FIG. 2) to place the flaps 112 in the open state. In the open state, the flaps 112 are moved out away from the space defined by the aperture 124 to effectively unblock or open the aperture 124. From the open state, the electrically-resistive trace 114 is controlled to generate less heat or no heat to reduce the temperature of the flaps 112. As the temperature of the flaps 112 at the hinge lines 120 decreases below the lower threshold temperature, the flaps 112 rotate or torque about the respective hinge lines 120 in a second rotational direction opposite the first rotational direction 178. When the flaps 112 are in the open state, flowable material, such as fluids, which is defined to include gases, are allowed to flow through the aperture 124. In contrast, when the flaps 112 are in the closed state, flowable material is not allowed to flow or is restricted from flowing through the aperture 124. Accordingly, deformation of the flaps 112 due to temperature modulations correspondingly opens and closes the aperture 124.

Although not shown, in some embodiments, each of the sections 122 of the electrically-resistive trace 114 is individually controlled to generate heat independently of the other sections 122. In this manner, a single one of the flaps 112 can be heated and deformed independently of the other flaps 112 if desired. In a specific implementation, the sections 122 are electrically isolated from each other and each section 122 is separately electrically coupled to the control module 130.

Figure 16:
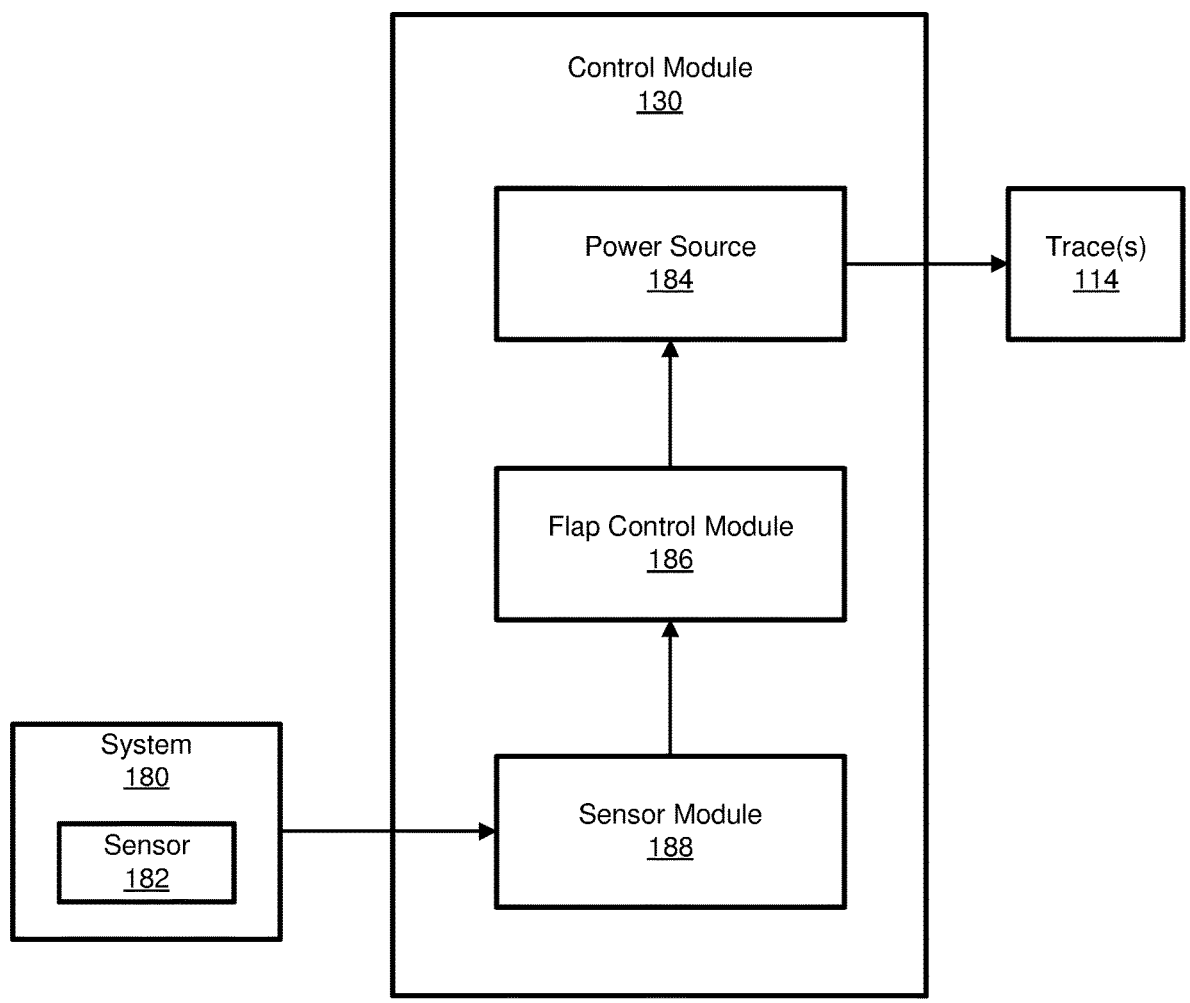
FIG. 16 is a schematic block diagram of a control module of a flow control device, according to one or more embodiments of the present disclosure.

Referring to FIG. 16, in one embodiment, the control module 130 includes the power source 184, a flap control module 186, and a sensor module 188. Although the power source 184, the flap control module 186, and the sensor module 188 are shown within the same box, because the box is merely schematic and does not represent a physical box, the power source 184, the flap control module 186, and the sensor module 188 can be in different physical locations, the same physical location, within the same physical box or housing, or different physical boxes or housings. The flap control module 186 is configured to control the delivery of electrical power or current to the electrically-resistive trace 114. In one implementation, the flap control module 186 is a switch that opens to deliver a constant, non-adjustable, magnitude of electrical power to the electrically-resistive trace 114. According to other implementations, the flap control module 186 includes logic to adjust the magnitude of electrical power delivered to the electrically-resistive trace 114. For example, in some implementations, the amount of deformation of the flaps 112 can be adjusted, so as to adjust the openness of the aperture 124 for adjusting a flow rate of material through the aperture 124, by adjusting the magnitude of the electrical power.

The flap control module 186 controls the electrical current delivered to the electrically-resistive trace 144 according to any of various factors, inputs, and considerations. According to some implementations, the flap control module 186 controls the electrical current delivered to the electrically-resistive trace 114 in response to input received from the sensor module 188. The sensor module 188 is configured to deliver information, to the flap control module 186, corresponding to sensed feedback detected by a sensor 182 of a system 180. The sensor 182 can be a physical sensor or a logic sensor. In one implementation, the system 180 is an engine system and the sensor 182 is a sensor that senses an operational condition of the engine system, such as, for example, engine rotations-per-minute (RPM), air speed, frequency, and/or flight regime, etc.).

The flow control device 102, and other flow control devices described herein, form part of a larger structure, such as a structure through which material is flowable in some implementations. In such implementations, the flow control device is configured to control flow of the material through the structure. The flow control device can be coupled to the structure or integrated into the structure as will be described below in more detail.

FIGS. 5-9, 11-13, and 20 show various embodiments of a flow control device. The respective flow control devices of FIGS. 5-9, 11-13, and 20 are analogous to the flow control device 102 of FIGS. 1-4, with like numbers referring to like features. More specifically, features of the flow control devices of FIGS. 5-9, 11-13, and 20 that are analogous to features of the flow control device 102 have the same number, but in a different series (e.g., 200-series, 300-series, 400-series, etc.) format rather than the 100-series format of the flow control device 102. Therefore, unless otherwise noted, the description, including the structure, function, and advantages, of the features of the flow control device 102 presented above are applicable to the analogous features of the respective flow control devices of FIGS. 5-9, 11-13, and 20.

Figure 5:
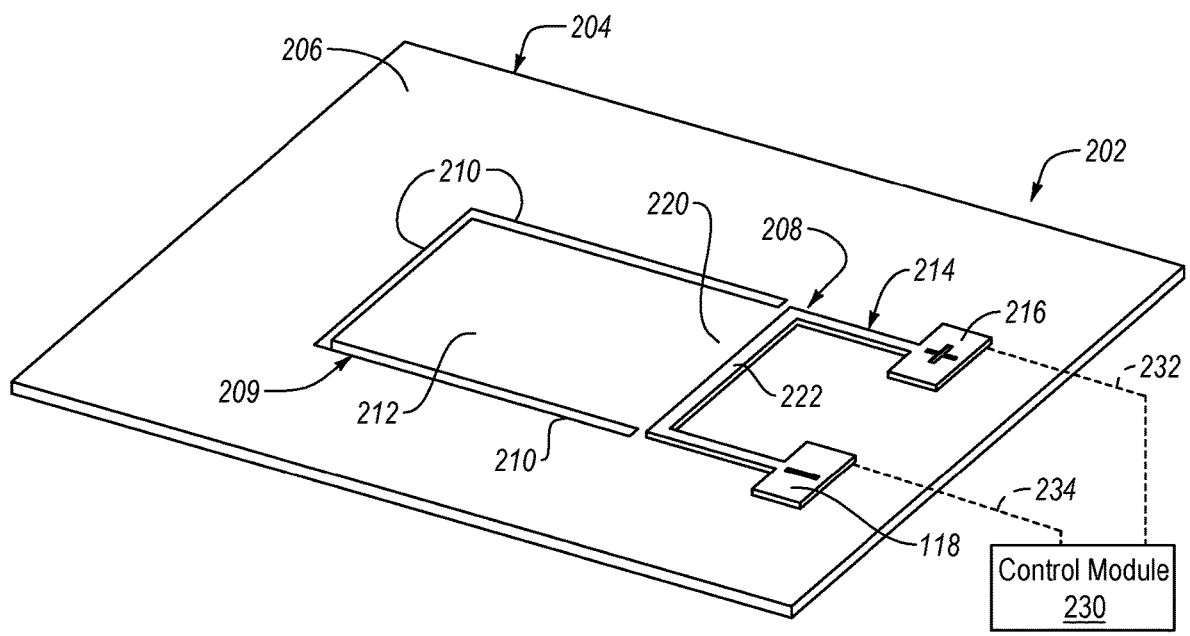
FIG. 5 is a schematic perspective view of a flow control device, in a closed state, according to one or more embodiments of the present disclosure.
Figure 6:
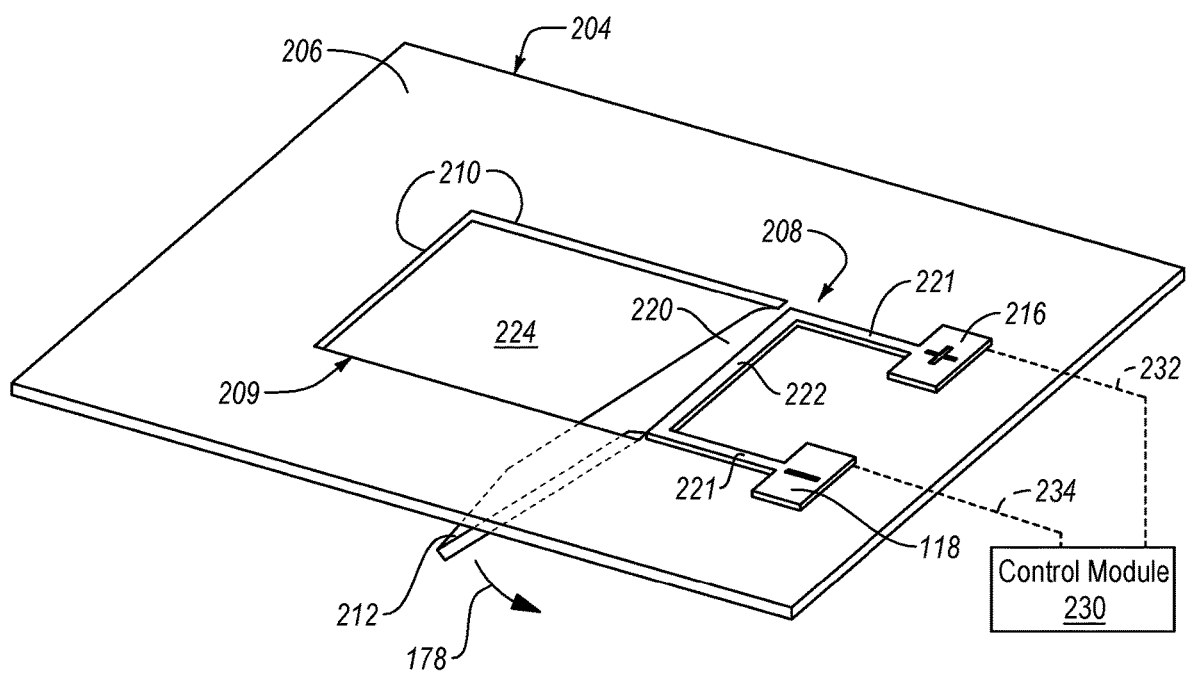
FIG. 6 is a schematic perspective view of the flow control device of FIG. 5, in an open state, according to one or more embodiments of the present disclosure.

Referring to FIGS. 5 and 6, instead of a plurality of intersecting slits forming a plurality of flaps, the flow control device 202 includes a single flap 212 defined by a plurality of slits 210. The slits 210 intersect with each other at ends, rather than at intermediate points along the slits as with the slits 110 of the flow control device 102. Additionally, the electrically-resistive trace 214 of the flow control element 208 includes a single section 222 printed on the first surface 206 of the sheet 204 adjacent the hinge line 220 of the flap 212. The flap 212 occupies the approximate entirety of the space defined by the aperture 224 such that a single flap effectively blocks or closes the aperture 224. Correspondingly, actuation of only the flap 212, via heat applied to the hinge line 220 from the section 222 of the electrically-resistive trace 214, is necessary to open and close the aperture 224. Although the illustrated flow control element 208 has three slits 210 arranged to define a single substantially rectangular-shaped flap 212, in other embodiments, the flow control element 208 has one slit 210, two slits 210, or more than three slits 210 to define a single flap 212 with any of various shapes (e.g., triangular, square, ovular, circular, polygonal, etc.).

Figure 19:
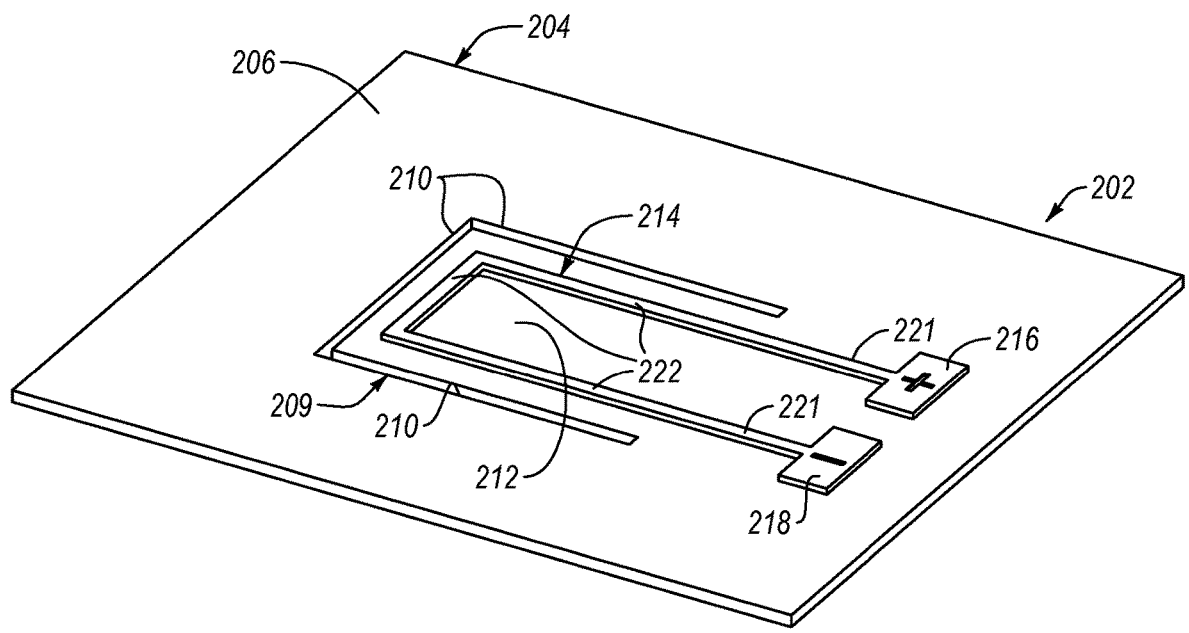
FIG. 19 is a schematic perspective view of a flow control device, in a closed state, according to one or more embodiments of the present disclosure.
Figure 20:
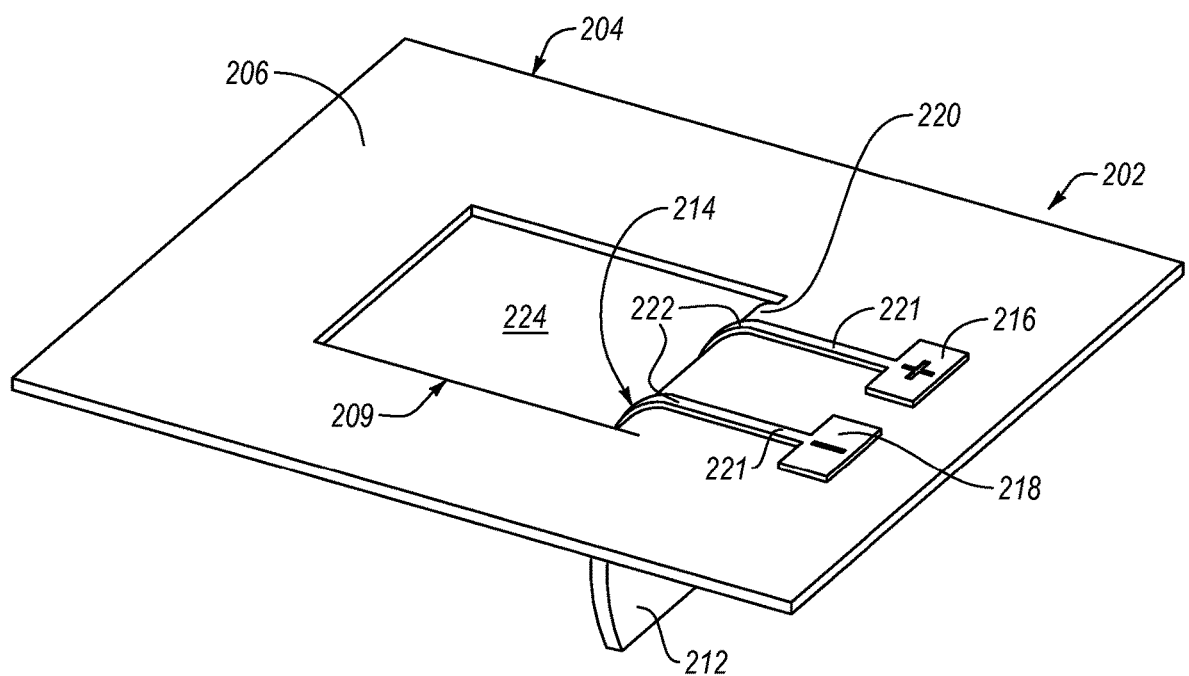
FIG. 20 is a schematic perspective view of the flow control device of FIG. 19, in an open state, according to one or more embodiments of the present disclosure.

According to some embodiments, the electrically-resistive trace is printed on the flap, as opposed to only adjacent a hinge line of the flap. For example, as shown in FIGS. 19 and 20, the electrically-resistive trace 214 of the flow control device 202 is printed directly onto the flap 212. The flap 212 of FIG. 19 has that same shape as the flap 212 of FIG. 5. However, the flap 212 of FIG. 19 is trained to deform differently than the flap 212 of FIG. 5. More specifically, the flap 212 of FIG. 19 is trained to roll about itself, while the flap 212 of FIG. 5 is trained to pivot about a hinge line 220 of the flap 212. Because the entirety of the flap 212 of FIG. 19 is configured to deform, as opposed to just a hinge line of the flap, the electrically-resistive trace 214 includes sections 222 that are printed directly onto the flap such that heat generated by the 222 increases the temperature of the entire flap 212 to promote deformation of the entire flap 212.

Figure 7:
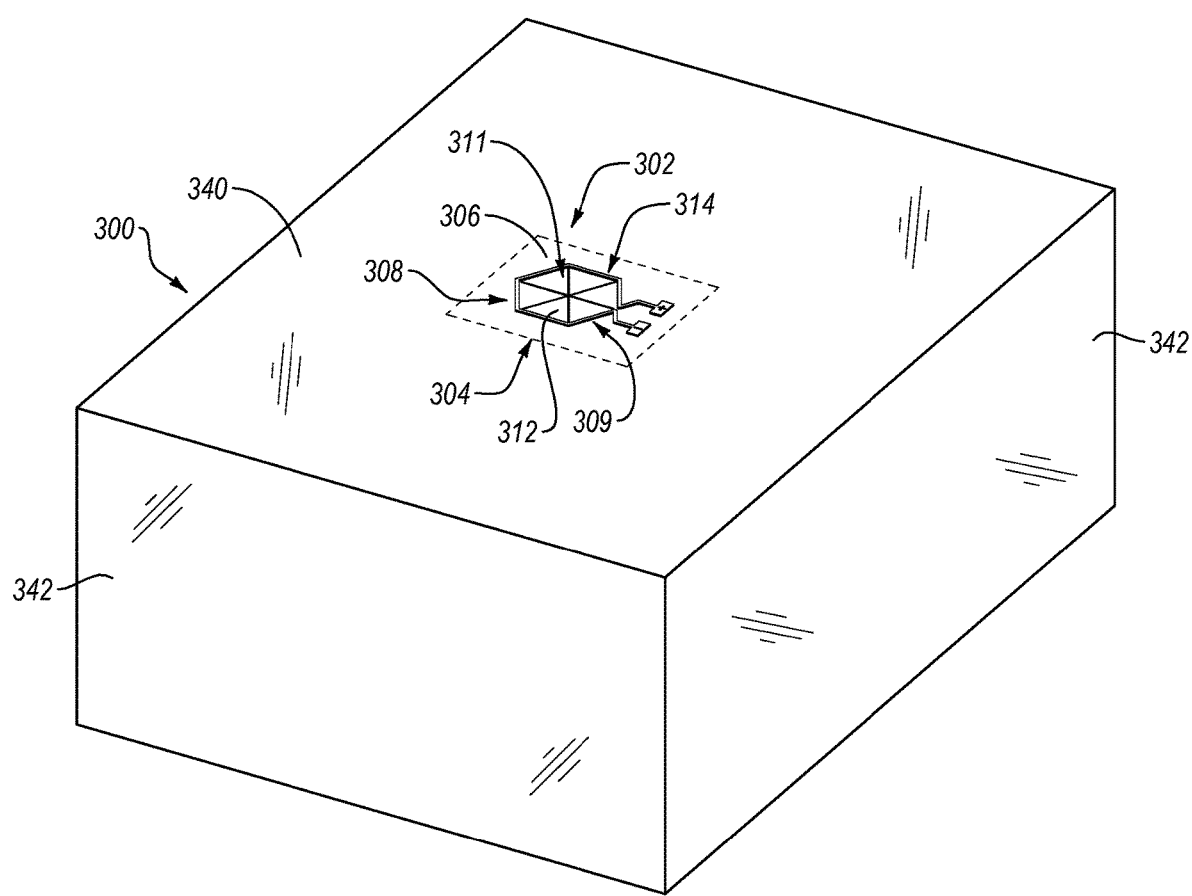
FIG. 7 is a schematic perspective view of a container that includes a flow control device, according to one or more embodiments of the present disclosure.

According to another embodiment, as shown in FIG. 7, the flow control device 302 forms part of a container 300. The container 300 includes a first wall 340 or panel and a plurality of second walls 342 coupled to the first wall 340. The first wall 340 and the second walls 342 together define an interior cavity. In some implementations, the interior cavity of the container 300 is fully enclosed, such that materials within the interior cavity are retained within the interior cavity by the first wall 340 and the second walls 342. One or more of the walls, or portions of the walls, may operate as a movable panel or door to allow restricted access to the interior cavity. In one example, the container 300 retains an electronic device, such as a battery, within the interior cavity of the container 300. The flow control device 302 is coupled to or integrated within the first wall 340 in one implementation. In one example, the first wall 340 is made from a material different than the material of the sheet 304 of the flow control device 302 (e.g., a non-electrically conductive material) and the sheet 304 of the flow control device 302 is attached to or embedded within (see, e.g., FIG. 12) the first wall 340. In another example, the sheet 304 of the flow control device 302 forms the entire first wall 340, such that the entire first wall 340 is made from an SMA material.

Moreover, the flow control device 302 is operable to deform the flaps 312 of the set of flaps 309 to open an aperture in the flow control device 302 and allow material within the interior cavity of the container 300 to flow out of the interior cavity or to allow material outside of the container 300 to flow into the interior cavity. According to one embodiment, the flow control device 302 opens the aperture in the flow control device 302 to vent hot air or other gases from the interior cavity of the container 300 in response to a sensed condition in the interior cavity or according to a periodic schedule.

Figure 8:
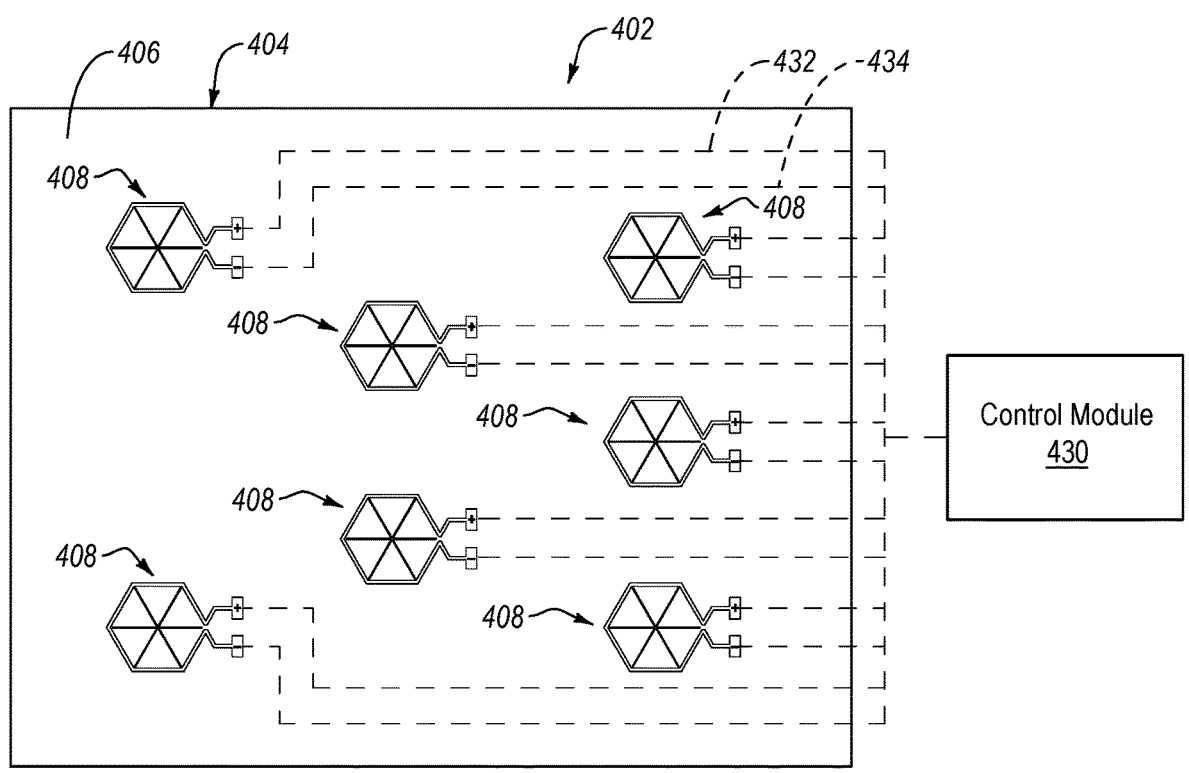
FIG. 8 is a schematic top plan view of a flow control device with multiple flow control elements, according to one or more embodiments of the present disclosure.

Referring now to FIG. 8, the flow control device 402 includes a sheet 404 and a plurality of flow control elements 408. The electrically-resistive trace of each of the flow control elements 408 is electrically coupleable to the control module 430 via a respective one of multiple sets of electrical connectors 432, 434. In the illustrated implementation, all the flow control elements 408 are formed on or in the same sheet 404. However, in other implementations, the flow control elements 408 can be formed on a respective one of separate sheets 404 that are joined together or attached to a base layer. The control module 430 is configured to control the electrical current delivered to the electrically-resistive traces of the flow control elements 408. In one implementation, the control module 430 delivers the electrical current of the same magnitude to each of the flow control elements 408 at the same time and rate. Accordingly, in such an implementation, the flow control elements 408 open and close together or concurrently. However, in another implementation, the control module 430 independently controls the flow control elements 408 and is capable of delivering the electrical current of the same or a different magnitude to each of the flow control elements 408 at different times or different rates. Accordingly, in this implementation, the flow control elements 408 can open and close at different times, rates, and levels of openness.

Figure 9:
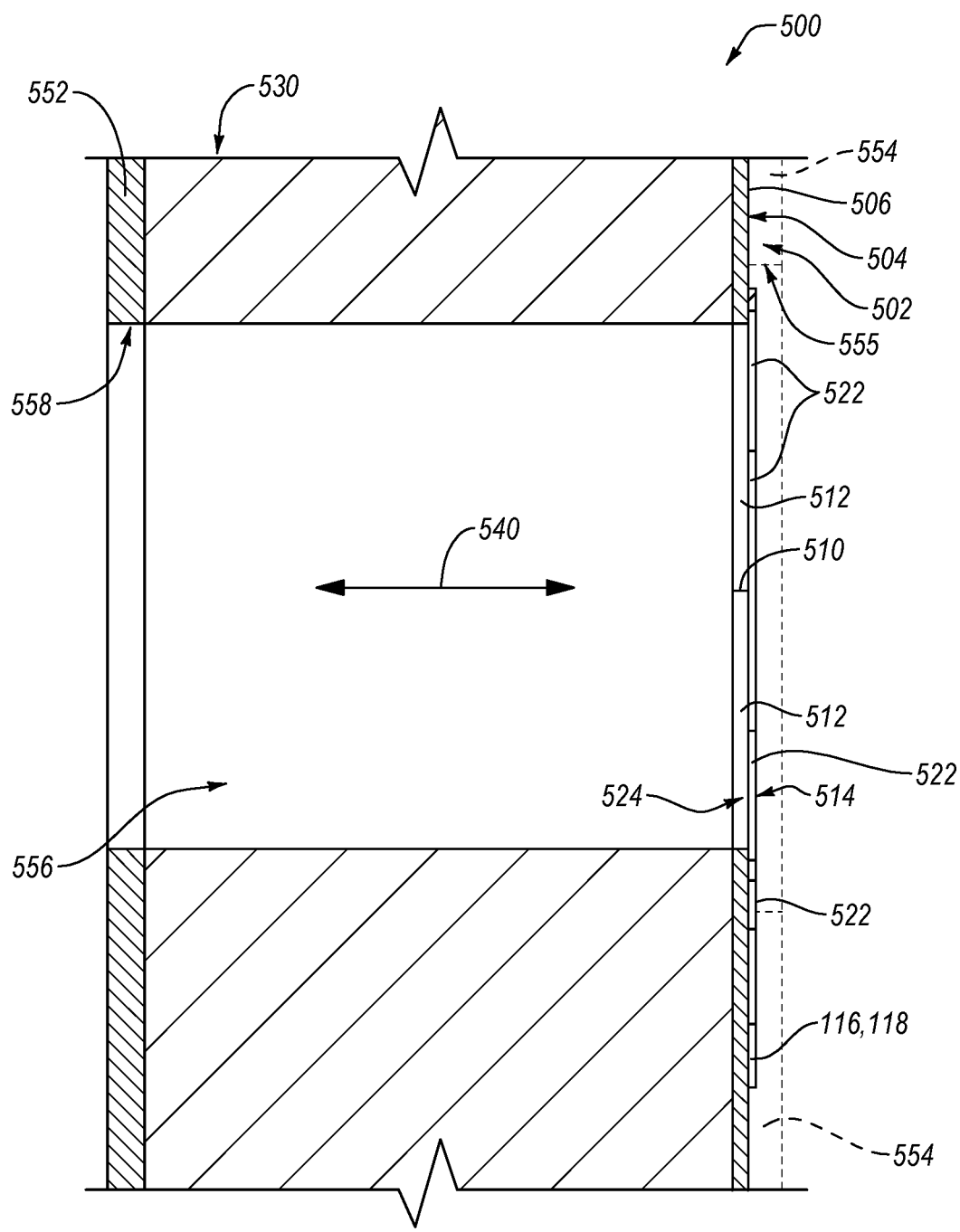
FIG. 9 is a schematic cross-sectional side view of a multi-layered apparatus that includes a flow control device, according to one or more embodiments of the present disclosure.

Referring to FIG. 9, and according to another embodiment, the flow control device 502 forms part of a composite structure 500. The composite structure 500 includes multiple layers, such as a first facesheet 552 and a core layer 550. The flow control device 502 is coupled to the core layer 550 so as to define a second facesheet of the composite structure. In other words, the core layer 550 is sandwiched between the first facesheet and the flow control device 502. The core layer 550 includes a cell 556 or conduit that facilitates the flow of material through the core layer 550 as indicated by directional arrows 540. The first facesheet 552 may also include an aperture 558 contiguous or aligned with the cell 556 to allow material to flow into the conduit 446 from external to the composite structure 500 and to flow out from the cell 556 to a location external to the composite structure 500. The aperture 524 of the flow control device 502 is contiguous or aligned with the cell 556. In some implementations, the composite structure 500 includes an additional layer 554 applied onto the flow control device 502 to sandwich the flow control device 502 between the core layer 550 and the additional layer. The additional layer 554 may include an aperture 555 contiguous or aligned with the aperture 524 of the flow control device 502. The flow control device 502 is operable to deform the flaps 512 to open the aperture 524 and allow material to flow through the cell 556 from one side of the composite structure 500 to the other. In other embodiments, the composite structure 500 includes fewer or more than the layers shown in FIG. 9.

Figure 10:
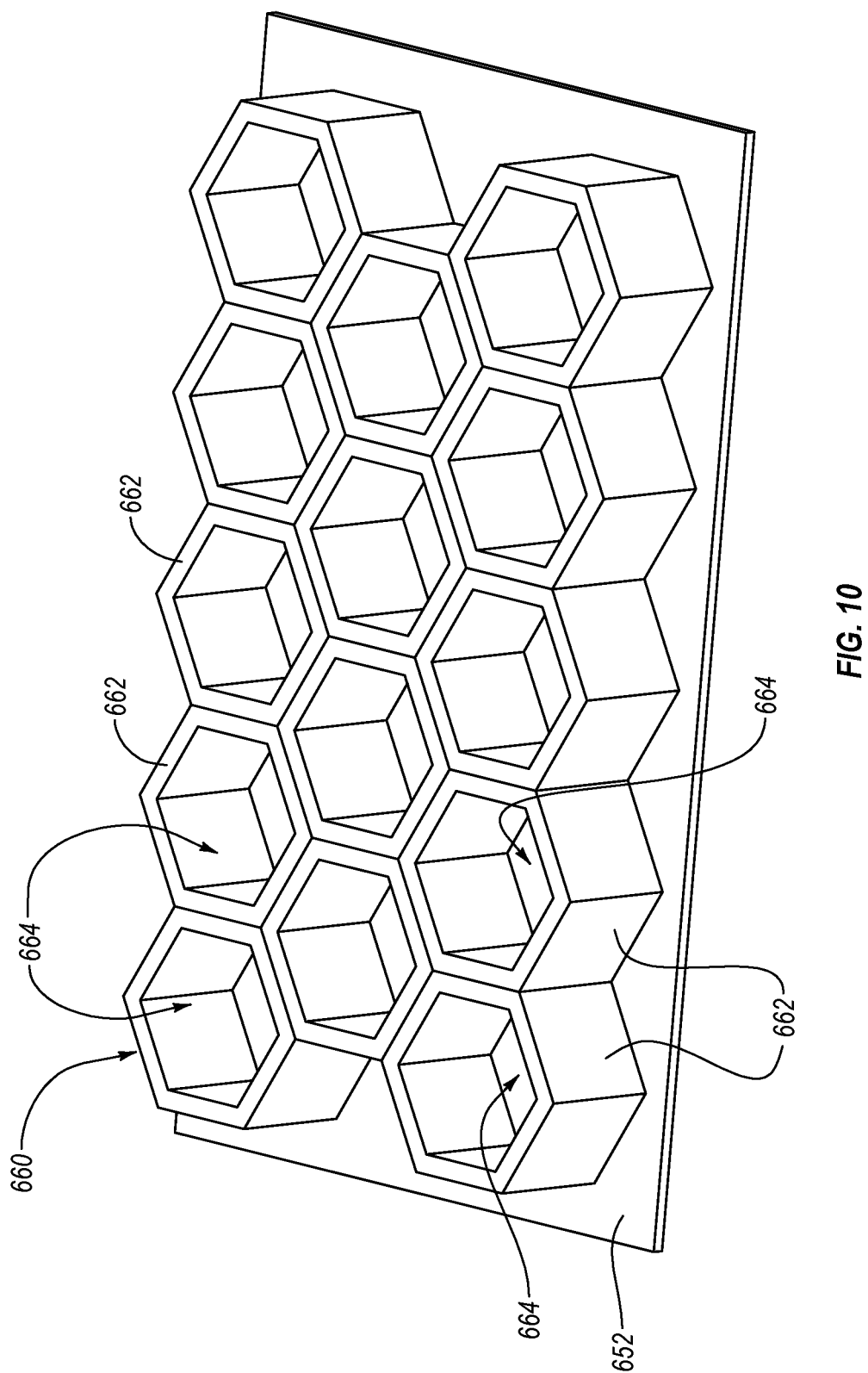
FIG. 10 is a schematic perspective view of a portion of layered apparatus that includes a multi-cell core layer, according to one or more embodiments of the present disclosure.
Figure 11:
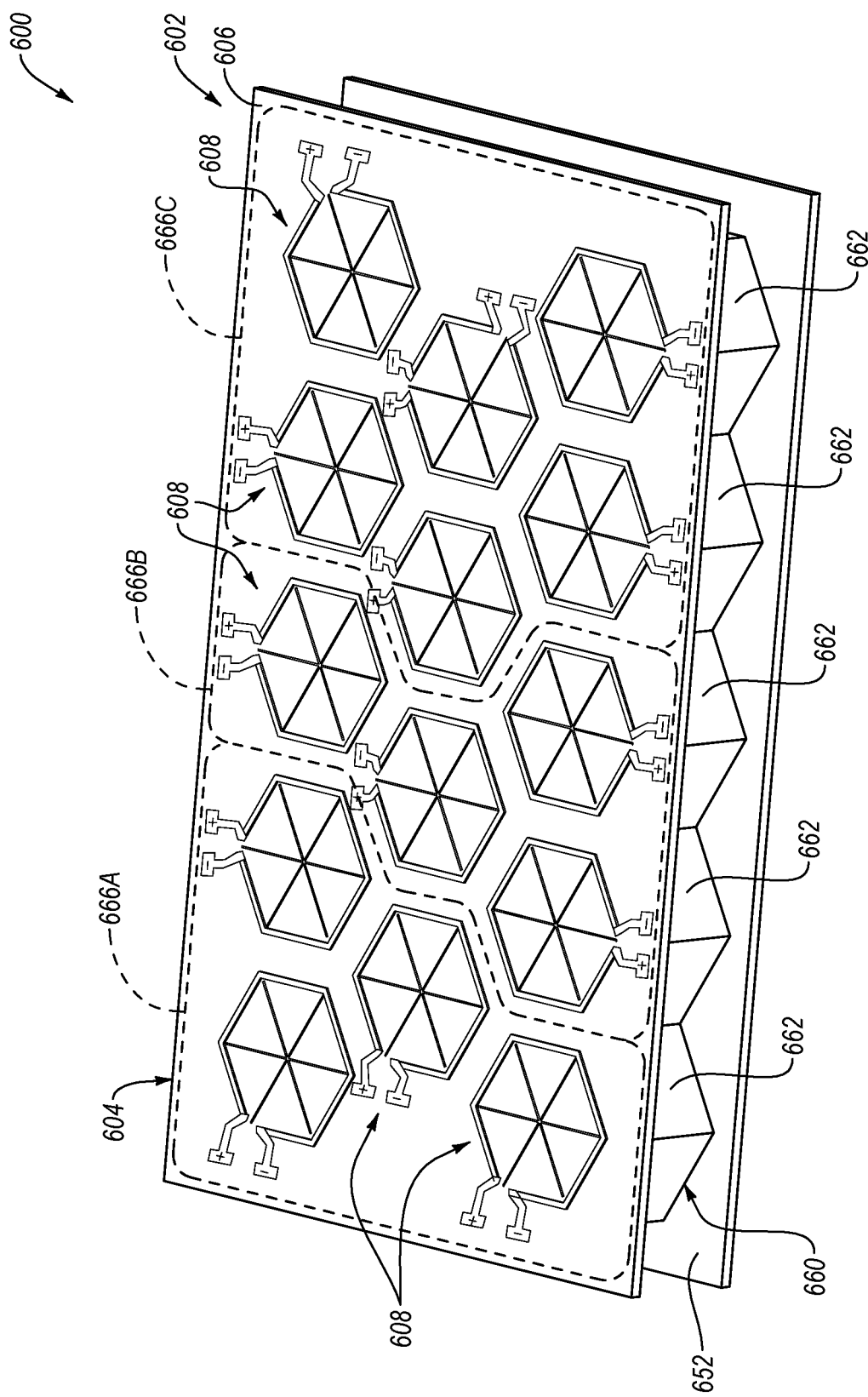
FIG. 11 is a schematic perspective view of a layered apparatus that includes the multi-cell core layer of FIG. 10 and multiple flow control devices each associated with a respective one of the cells of the multi-cell core layer, according to one or more embodiments of the present disclosure.

Now referring to FIGS. 10 and 11, another embodiment of a composite structure 600 with a flow control device 602 forming a part thereof is shown. Like the composite structure 500, the composite structure 600 includes a first facesheet 652 and a core layer. The core layer is a multi-cell core 660 that includes a plurality of evenly-spaced cells 662. Each cell 662 defines an interior space 664. The cells 662 can have any of various shapes. In the illustrated embodiment, the cells 662 each have a hexagonal shape such that the multi-cell core 660 forms a honeycomb structure. The composite structure 600 additionally includes the flow control device 602 coupled to the multi-cell core 660 so as to define a second facesheet of the composite structure. In other words, the multi-cell core 660 is sandwiched between the first facesheet and the flow control device 602.

Like the flow control device 402 of FIG. 8, the flow control device 602 includes a plurality of flow control elements 608. The electrically-resistive trace of each of the flow control elements 608 is electrically coupleable to a control module, which controls the flow of electrical current to the flow control elements 608 for opening and closing the flaps of the flow control elements 608. The flow control elements 608 are arranged on the sheet 604 such that each flow control element 608 is aligned with a respective one of the cells 662 of the multi-cell core 660. In this manner, each flow control element 608 is configured to control flow through a respective cell 662. A control module delivers the electrical current of the same magnitude to each of the flow control elements 608 at the same time and rate in one implementation. However, in another implementation, a control module independently controls the flow control elements 608 and is capable of delivering the electrical current of the same or a different magnitude to each of the flow control elements 608, or a grouping (e.g., first grouping 666A, second grouping 666B, third grouping 666C, etc.) at different times or different rates. Accordingly, in this implementation, the flow control elements 408 can open and close at different times, rates, and levels of openness.

According to one embodiment, the composite structure 600 forms an exterior panel of an engine nacelle or other housing for which acoustic dampening or management is a concern. For objects traveling at high rates of speed, such as aircraft, or structures having components that move at high rates of speed, e.g., engines, managing the acoustic resonance of such objects and structures can be important. Traditionally, acoustic resonance is controlled with anechoic structures, which have complex shapes and designs, are expensive to manufacture, and are difficult to integrate into composite structures. Other techniques include the use of mechanized systems, such as active valves and pumps, which require complex control systems, add significant weight and volume, and require frequent inspection and repair. The composite structure 600 improves upon traditional techniques by utilizing solid-state flow control elements 608 to control acoustic resonance by opening and closing the cells 662, individually and/or as a group, to allow air, or other gasses, to enter or prevent air, or other gasses, from entering the interior spaces 664 of the cells 662.

Figure 12:
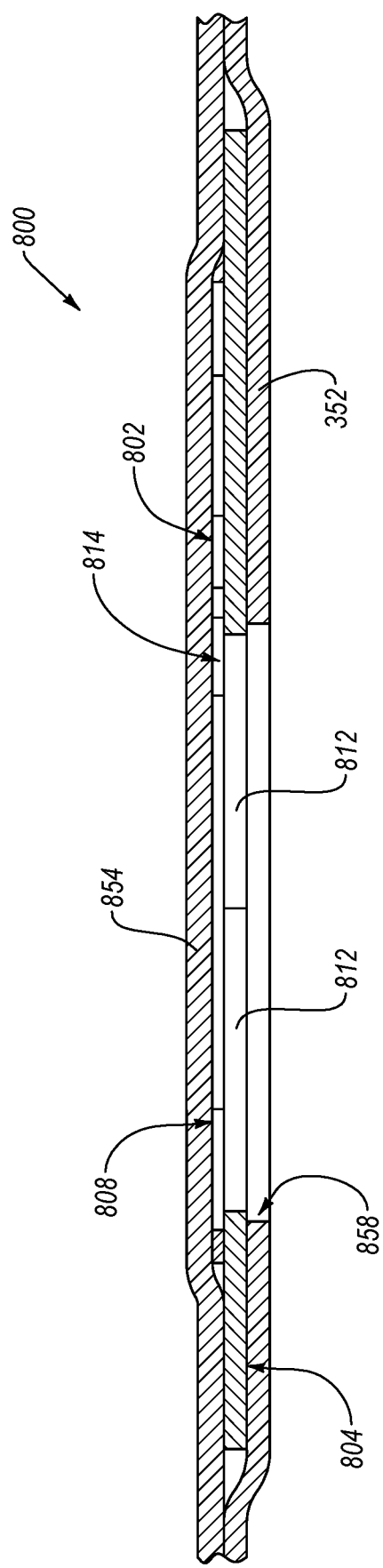
FIG. 12 is a schematic cross-sectional side elevation view of a layered apparatus with a flow control device embedded within the layered apparatus, according to one or more embodiments of the present disclosure.

Referring now to FIG. 12, and according to another embodiment, the flow control device 802 is embedded in a composite wall 800. More specifically, the flow control device 802 is sandwiched between a first layer 852 and a second layer 854. The electrically-resistive trace 814 of the flow control device 802, being directly written onto the sheet 804 and the solid-state control of the flaps 812 via SMA techniques, promote the ability to embed the flow control device 802 between two layers of a multi-layered structure, such as the composite wall 800.

Figure 13:
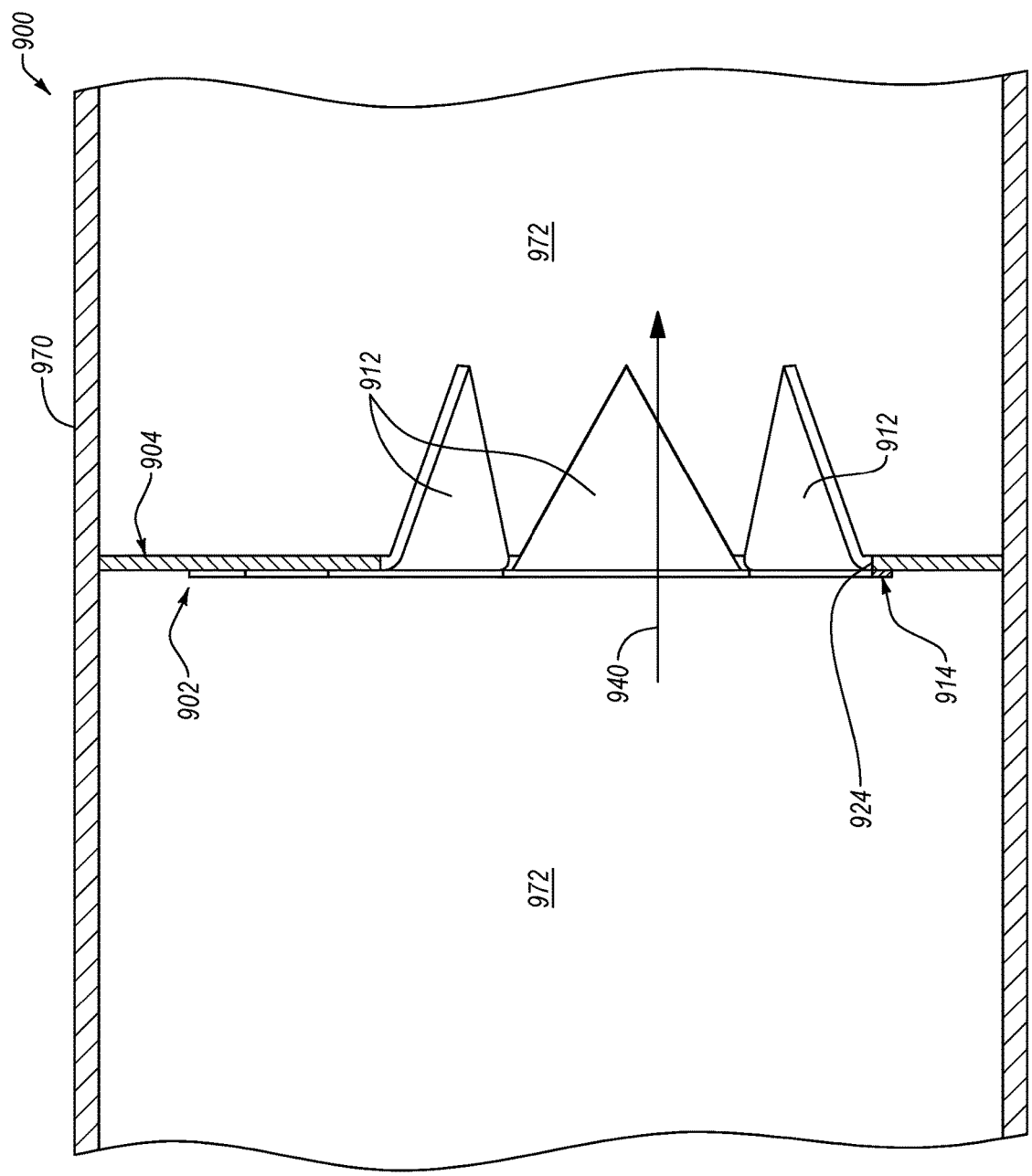
FIG. 13 is a schematic cross-sectional side elevation view of a conduit and a flow control device positioned within the conduit, according to one or more embodiments of the present disclosure.

According to yet another embodiment, as shown in FIG. 13, the flow control device 902 is integrated into a conduit 900. The conduit 900 defines an interior channel 972 through which a fluid or gas is flowable, as indicated by directional arrow 940. In one implementation, the conduit 900 is a tube. The flow control device 902 is positioned within the interior channel 972 of the conduit 900. Moreover, the flow control device 902 is oriented perpendicular to the flow of the fluid through the conduit 900. Generally, the flow control device 902 is operable, as presented above, to open and close the aperture 924, which adjusts the flow rate of fluid through the conduit. In this manner, the flow control device 902 acts as a solid-state valve.

Figure 14:
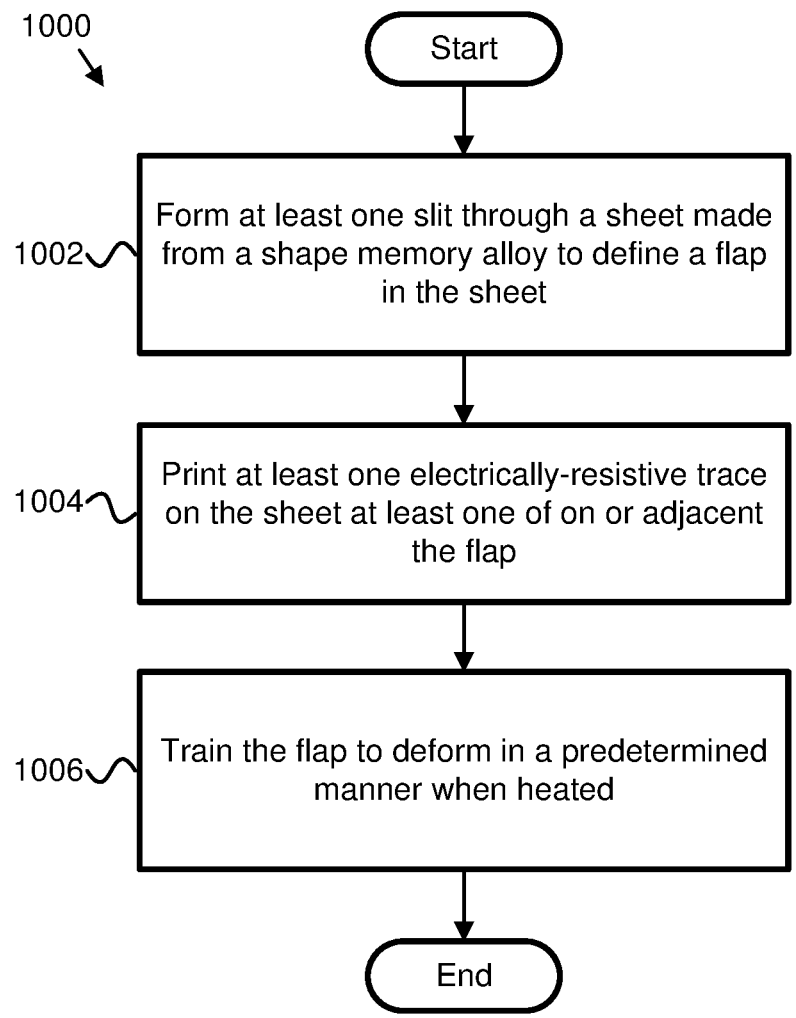
FIG. 14 is a schematic flow diagram of a method of making a flow control device, according to one or more embodiments of the present disclosure.
Figure 17:
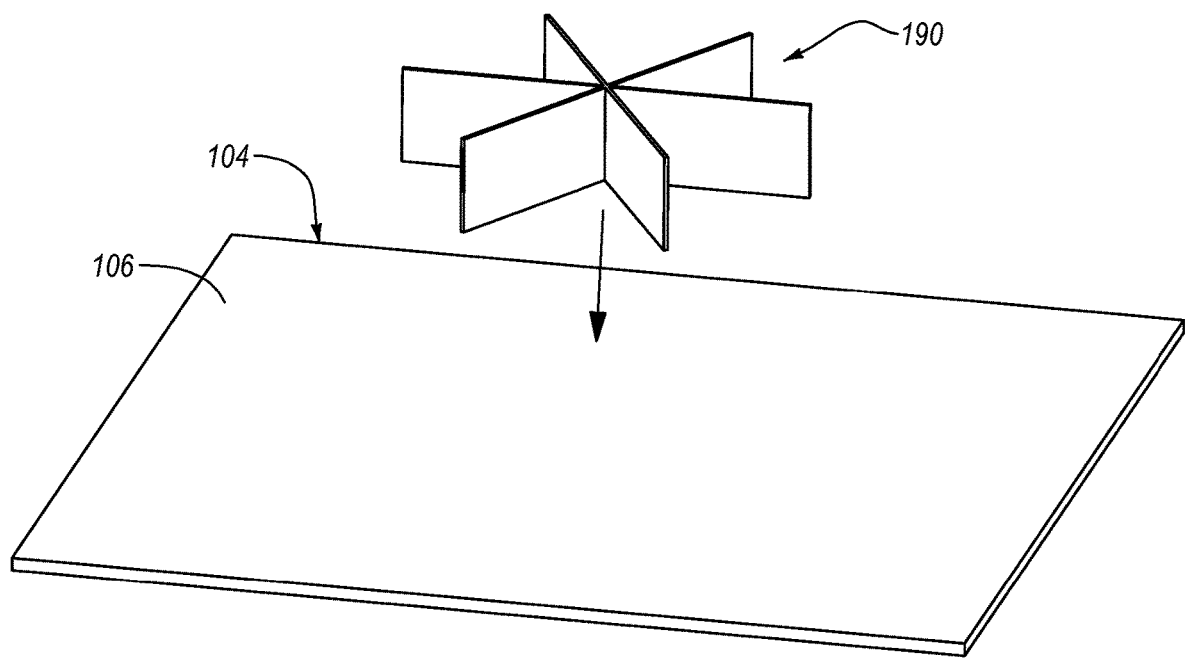
FIG. 17 is a schematic perspective view of a punch tool in position to punch multiple slits in a sheet made from a shape memory alloy, according to one or more embodiments of the present disclosure.
Figure 18:
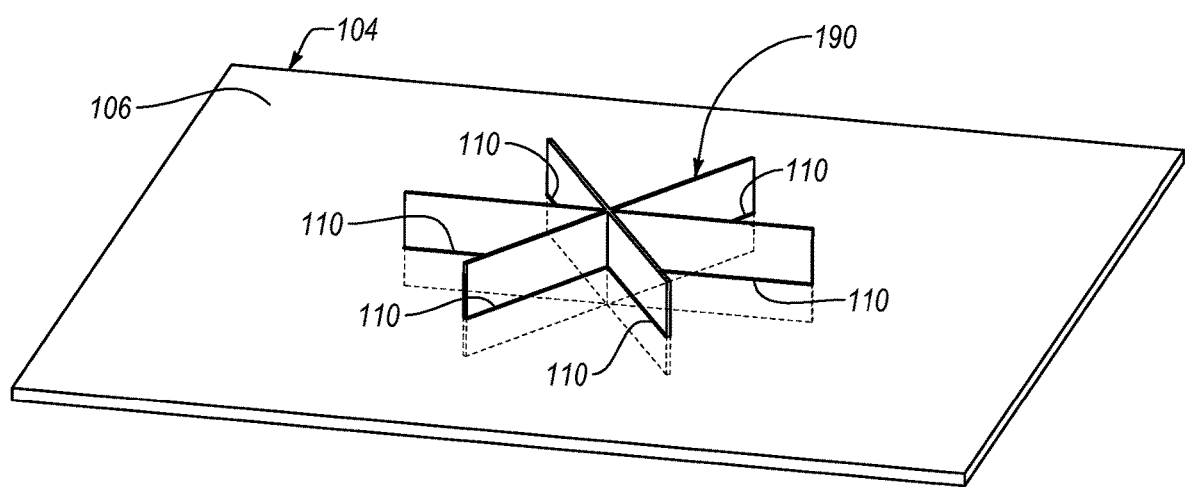
FIG. 18 is a schematic perspective view of the punch tool of FIG. 17 penetrating the sheet to form multiple slits in the sheet, according to one or more embodiments of the present disclosure.

Referring to FIG. 14, a method 1000 of making a flow control device, such as the flow control devices described above, includes forming at least one slit through a sheet made from a shape memory alloy (SMA) to define a flap in the sheet at 1002. In some implementations, the slit is formed via a machining or molding process. Alternatively, in certain implementations, as shown in FIGS. 17 and 18, the slit can be formed via a stamping process. For example, a stamping tool 190 shaped according to a desired pattern of the slits 110 is driven into and through the sheet 104 of shape memory alloy to form the slits 110. The method 1000 also includes printing at least one electrically-resistive trace on the sheet at least one of on or adjacent the flap at 1004. Printing the electrically-resistive trace can be accomplished via any of various deposition techniques, such as masking and spraying, screen printing, sintering, and the like. The method 1000 further includes training the flap to deform in a predetermined manner when heated at 1006. Generally, training the flap includes repetitively mechanically deforming the flap in a desired manner.

Figure 15:
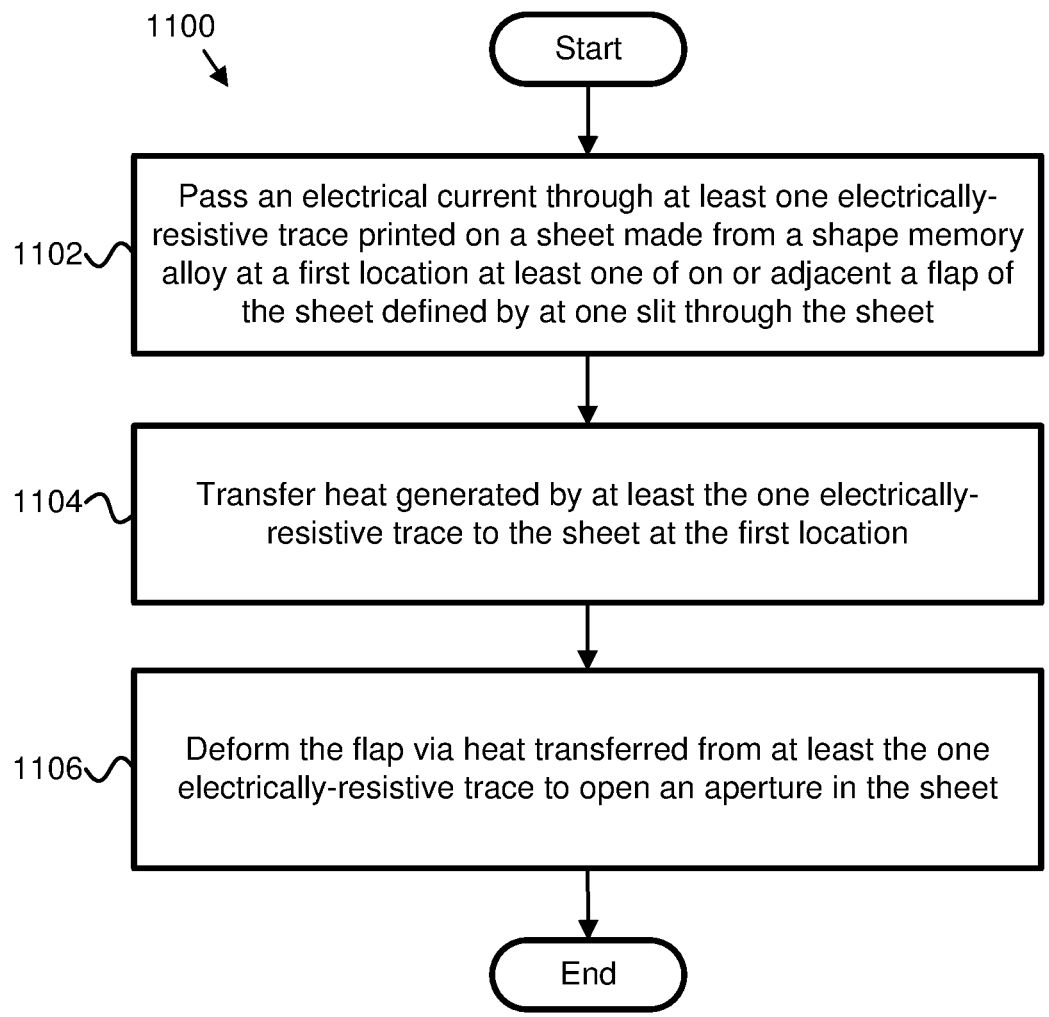
FIG. 15 is a schematic flow diagram of a method of controlling flow, according to one or more embodiments of the present disclosure.

Now referring to FIG. 15, a method 1100 of controlling flow includes passing an electrical current through at least one electrically-resistive trace printed on a sheet made from a shape memory alloy at a first location at least one of on or adjacent a flap of the sheet defined by at least one slit through the sheet at 1102. The method 1100 also includes transferring heat generated by at least the one electrically-resistive trace to the sheet at the first location at 1104. The method 1100 further includes deforming the flap via the heat transferred from at least the one electrically-resistive trace to open an aperture in the sheet at 1106.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The described features, structures, or characteristics of the embodiments may be combined in any suitable manner. In the above description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A flow control device, comprising:
    a sheet made from a shape memory alloy;
    at least one slit through the sheet, wherein at least the one slit defines at least one flap in the sheet; and
    at least one electrically-resistive trace printed on the sheet at least one of on or adjacent each hinge of at least the one flap, wherein, upon receipt of an electrical current, at least the one electrically-resistive trace configured to generate heat for deforming each hinge of at least the one flap relative to the sheet and opening an aperture formed in the sheet, the at least one electrically-resistive trace comprising a continuous trace around the aperture and divided into contiguous sections that each correspond to each hinge of at least the one flap.

2. The flow control device according to claim 1, wherein at least the one electrically-resistive trace includes a positive temperature coefficient ink.

3. The flow control device according to claim 1, wherein at least the one electrically-resistive trace is printed adjacent at least the one flap.

4. The flow control device according to claim 1, wherein at least the one electrically-resistive trace is printed on at least the one flap.

5. The flow control device according to claim 1, further comprising a control module electrically coupleable with at least the one electrically-resistive trace and configured to control the electrical current delivered to at least the one electrically-resistive trace.

6. The flow control device according to claim 5, wherein:
the control module comprises a sensor module configured to receive sensed feedback from a sensor of a system; and
the control module is further configured to control the electrical current delivered to at least the one electrically-resistive trace responsive to the sensed feedback.

7. The flow control device according to claim 5, wherein the control module is further configured to adjust:
a magnitude of the electrical current delivered to at least the one electrically-resistive trace;
a magnitude of the heat generated by at least the one electrically-resistive trace in response to an adjustment to the magnitude of the electrical current; and
a deformation of at least the one flap relative to the sheet and an openness of the aperture formed in the sheet in response to the adjustment to the magnitude of the electrical current.

8. The flow control device according to claim 1, further comprising a set of slits through the sheet and intersecting each other, wherein:
the set of slits intersect each other to define a set of flaps in the sheet;
at least the one electrically-resistive trace is printed on the sheet at least one of on or adjacent each of the flaps of the set of flaps; and
upon receipt of the electrical current, at least the one electrically-resistive trace is further configured to generate heat for deforming each of the flaps of the set of flaps relative to the sheet and opening the aperture formed in the sheet.

9. The flow control device according to claim 8, further comprising:
a plurality of sets of slits through the sheet, wherein each set of the plurality of sets of slits defines a respective set of a plurality of sets of flaps; and
a plurality of electrically-resistive traces printed on the sheet, wherein each electrically-resistive trace of the plurality of electrically-resistive traces is:
at least one of on or adjacent each of the flaps of a respective set of the plurality of sets of flaps; and
configured to generate heat for deforming the flaps of a respective set of the plurality of sets of flaps and opening a respective aperture of a plurality of apertures formed in the sheet.

10. The flow control device according to claim 9, further comprising a control module electrically coupleable with the plurality of electrically-resistive traces and configured to separately and independently control the electrical current delivered to the plurality of electrically-resistive traces to separately and independently open the plurality of apertures formed in the sheet.

11. The flow control device according to claim 1, wherein the sheet is a two-dimensional sheet.

12. The flow control device according to claim 1, wherein:
at least the one flap in the sheet comprises a hinge line; and
at least the one electrically-resistive trace is printed on the sheet on the hinge line of at least the one flap.

13. An apparatus, comprising:
a structure through which a material is flowable;
a flow control device coupled to the structure to control flow of the material through the structure, wherein the flow control device comprises:
a sheet made from a shape memory alloy; and
at least one flow control element, comprising:
at least one slit through the sheet, wherein at least the one slit defines at least one flap in the sheet; and
at least one electrically-resistive trace printed on the sheet at least one of on or adjacent each hinge of at least the one flap, wherein, upon receipt of an electrical current, at least the one electrically-resistive trace is configured to generate heat for deforming each hinge of at least the one flap relative to the sheet and opening an aperture formed in the sheet, the at least one electrically-resistive trace comprising a continuous trace around the aperture and divided into contiguous sections that each correspond to each hinge of at least the one flap.

14. The apparatus according to claim 13, wherein:
the structure comprises a container comprising at least one wall that defines an interior cavity;
the at least one wall comprises the flow control device; and
the flow control device is configured to control flow of the material between the interior cavity and a space adjacent and external to the interior cavity.

15. The apparatus according to claim 13, wherein:
the structure comprises a core layer comprising at least one cell;
the flow control device is coupled to the core layer and configured to control flow through at least the one cell.

16. The apparatus according to claim 15, wherein:
the core layer further comprises multiple cells; and
the flow control device further comprises multiple flow control elements each configured to control flow through a respective cell of the multiple cells.

17. The apparatus according to claim 13, wherein:
the structure comprises a wall comprising a first layer and a second layer; and
the flow control device is embedded between the first layer and the second layer of the wall.

18. The apparatus according to claim 13, wherein:
the structure comprises a conduit; and
the flow control device is positioned within the conduit.

19. A method of making a flow control device, comprising:
forming at least one slit through a sheet made from a shape memory alloy to define at least one flap in the sheet;
printing at least one electrically-resistive trace on the sheet at least one of on or adjacent each hinge of the at least one flap; and
training the at least one flap to deform in a predetermined manner when heated to open an aperture in the sheet,
wherein the at least one electrically-resistive trace comprises a continuous trace around the aperture and is divided into contiguous sections that each correspond to each hinge of the at least one flap.

20. A method of controlling flow, comprising:
passing an electrical current through at least one electrically-resistive trace printed on a sheet made from a shape memory alloy at a first location at least one of on or adjacent each hinge of at least one flap of the sheet defined by at least one slit through the sheet;
transferring heat generated by at least the one electrically-resistive trace to the sheet at the first location; and
deforming the at least one flap at each hinge of the at least one flap via heat transferred from at least the one electrically-resistive trace to open an aperture in the sheet, wherein the at least one electrically-resistive trace comprises a continuous trace around the aperture and is divided into contiguous sections that each correspond to each hinge of the at least one flap.

21. The method of claim 20, further comprising the step of electrically coupling a control module, which is configured to control an electrical current, with at least the one electrically-resistive trace.

22. The method of claim 21, further comprising the step of controlling, via the control module, the electrical current delivered to at least the one electrically-resistive trace.

23. The method of claim 22, further comprising the steps of:
   receiving, via a sensor module, sensed feedback from a sensor of a system, and
   controlling, via the control module, the electrical current delivered to at least the one electrically-resistive trace based on the sensed feedback.

24. The method of claim 23, further comprising the steps of adjusting via the control module:
   a magnitude of the electrical current delivered to at least the one electrically-resistive trace;
   a magnitude of the heat generated by at least the one electrically-resistive trace in response to an adjustment to the magnitude of the electrical current; and
   a deformation of at least the one flap relative to the sheet and an openness of the aperture formed in the sheet in response to the adjustment to the magnitude of the electrical current.

* * * * *